ALEXANDER E. MARTENS
INVENTOR.

BY Charles C. Krawczyk

ATTORNEY

United States Patent Office

3,487,222
Patented Dec. 30, 1969

3,487,222
AUTOMATIC GAIN CONTROL FOR SELF-CALIBRATING A DETECTION SYSTEM
Alexander E. Martens, Greece, N.Y., assignor to Bausch & Lomb Incorporated, Rochester, N.Y., a corporation of New York
Filed Nov. 3, 1967, Ser. No. 680,416
Int. Cl. H01j 39/12
U.S. Cl. 250—214　　　　　　　　　　　　　6 Claims

ABSTRACT OF THE DISCLOSURE

An automatic gain control for self-calibrating a detection system is disclosed for use with pulse height analysis apparatus of the type including a threshold detection circuit for accepting pulses above a preset minimum amplitude. Pulsating reference signals are periodically applied to a transducer that corresponds to known physical events or quantities and provide a standard for calibration. The transducer generates corresponding electrical signals. A gain control circuit monitors the amplitude of the reference signals received by the threshold detector and its operation and adjusts the gain of the apparatus to maintain a predetermined correlation between the amplitude of the reference signals and the operation of the threshold detector.

BACKGROUND OF THE INVENTION

This invention relates to automatic gain control of detection systems.

Electrical apparatus for measuring physical events or quantities usually includes a transducer for converting the measured events or quantities into electrical energy. Generally, the amplitude or magnitude of the electrical signal is directly related to the physical event or quantity measured. In many cases, it is desirable to exclude physical events or quantities below a preset minimum level, or unwanted noise signals generated by the apparatus. For example, in particle counters or particle size detectors it is often desired to monitor particles of a predetermined minimum size and greater. The operation of such apparatus is based upon pulse height discrimination and generally includes a threshold detection circuit to reject signals below a preset minimum amplitude. The preset minimum amplitude, in turn, is related to the minimum physical event or quantity to be measured.

In order to insure that the amplitude of the signals received by the threshold detector maintains a fixed relation with the physical event or quantity, the transfer function between the transducer and the threshold detector circuit must be frequently checked and calibrated if necessary. This is particularly true in photoelectric systems wherein the operation of the photoelectric transducer is highly sensitive to changes in temperature and power supply voltages. The calibration of such a system generally requires a reference signal to be applied to the transducer and the system calibrated so that the threshold circuit accurately responds to the correct level of reference signal. This may involve a period of equipment shutdown and a tedious manual calibration procedure in order to assure the accuracy of system.

SUMMARY OF THE INVENTION

The automatic gain control circuit of the invention automatically maintains a fixed relation between a source of reference or standard signals of the type to be measured and the operation of a threshold detection circuit. Electrical signals corresponding to the reference signals are applied to a threshold detection circuit through an adjustable gain circuit. The threshold circuit is set to accept signals above a first preset level that corresponds to a predetermined minimum acceptable signal to be measured. Circuit means are coupled to the threshold circuit to develop a first and a second control signal. The first control signal is developed when the amplitude of the signal applied to the threshold circuit is between a minimum level and the first preset level. The second control signal is developed when the signal exceeds a second preset level greater than the first. A gain control circuit, responsive to the first and second control signals, controls the gain of the adjustable gain circuit so that the amplitude of the signal applied to the threshold circuit (corresponding to the reference signal) is between the first and second preset levels.

DESCRIPTION OF THE PREFERRED EMBODIMENT

In electronic pulse height measuring systems such as dust counters, particle size detectors, etc., a threshold type detector circuit is generally employed to trigger on pulses above a preset amplitude corresponding to the minimum physical event or quantity to be measured. The triggering level of the threshold detector can therefore be considered as one reference to which the system can be calibrated. The transfer function of the system prior to the threshold circuit, including any transducer, can therefore be calibrated with respect to the preset triggering level so that the threshold circuit can accurately reject signals corresponding to physical events or quantities below the preset minimum level.

Figure 1:
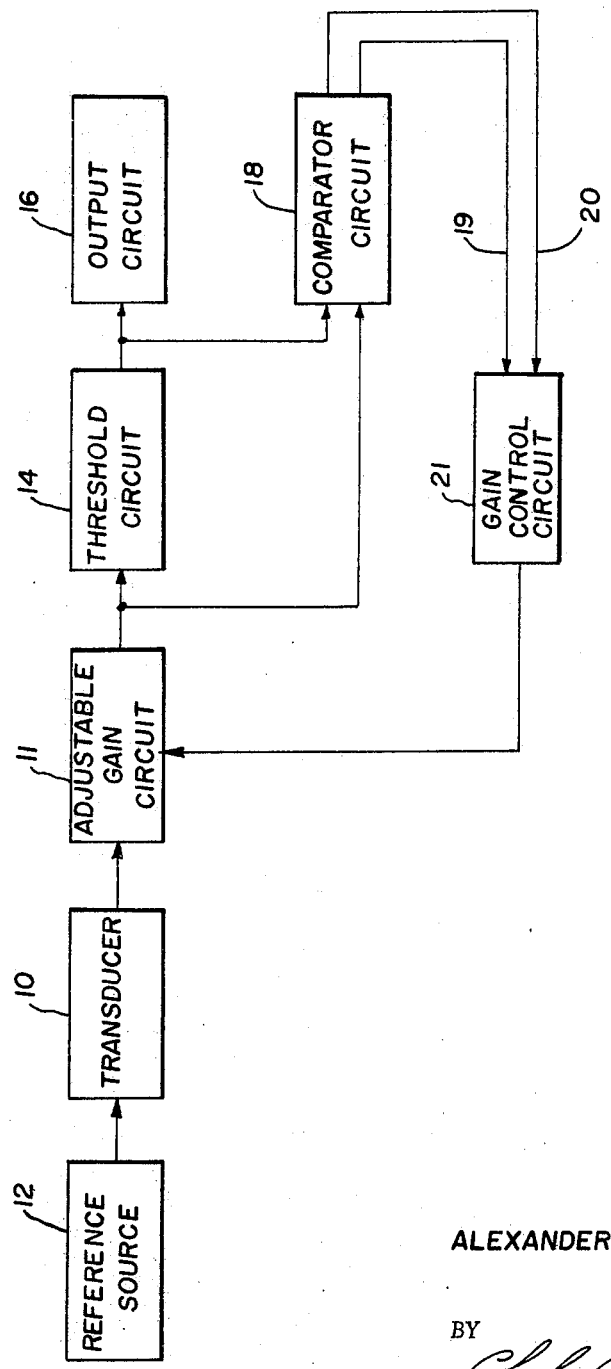
FIGURE 1 is a simplified block diagram of the automatic gain control system of the invention.

In the automatic gain control system of FIGURE 1, a measuring transducer 10 is coupled to apply electrical signals to an adjustable gain circuit 11. The transducer is responsive to physical events or quantities to generate an electrical signal having an amplitude or magnitude proportional to the physical events or quantities. A reference source 12 applies known pulse type physical events or quantities to the transducer 10 to provide a standard for calibrating the system. The adjustable gain circuit 11 is coupled to apply signals to a threshold circuit 14. The threshold circuit 14 rejects signals below a first preset level and is triggered by signals above the preset level. The signals exceeding the first preset level are applied to an output circuit 16 providing an indication corresponding to the pulse rate of the signals above the preset level.

A comparator circuit 18 monitors the amplitude of the signals applied to the threshold circuit 14 and its operation, to generate a first control signal on a line 19 and a second control signal on a line 20. The first control signal is developed when the amplitude of the signals applied to the threshold circuit 10 is within a range above a maximum noise level and below the first preset level. The second control signal is developed when the amplitude of the signals exceed a second preset level, which is greater than the first preset level. The first and second control signals are applied to a gain circuit 21. The gain control circuit 21 is responsive to the control signals to control the gain of the adjustable gain circuit 11 so that the amplitude of signals applied to the threshold circuit falls between the first and second preset levels, a range of signal amplitudes called a "window." The "window" determines the tolerance to which the transfer function of the system is calibrated to the known physical events or quantities.

Figure 2:
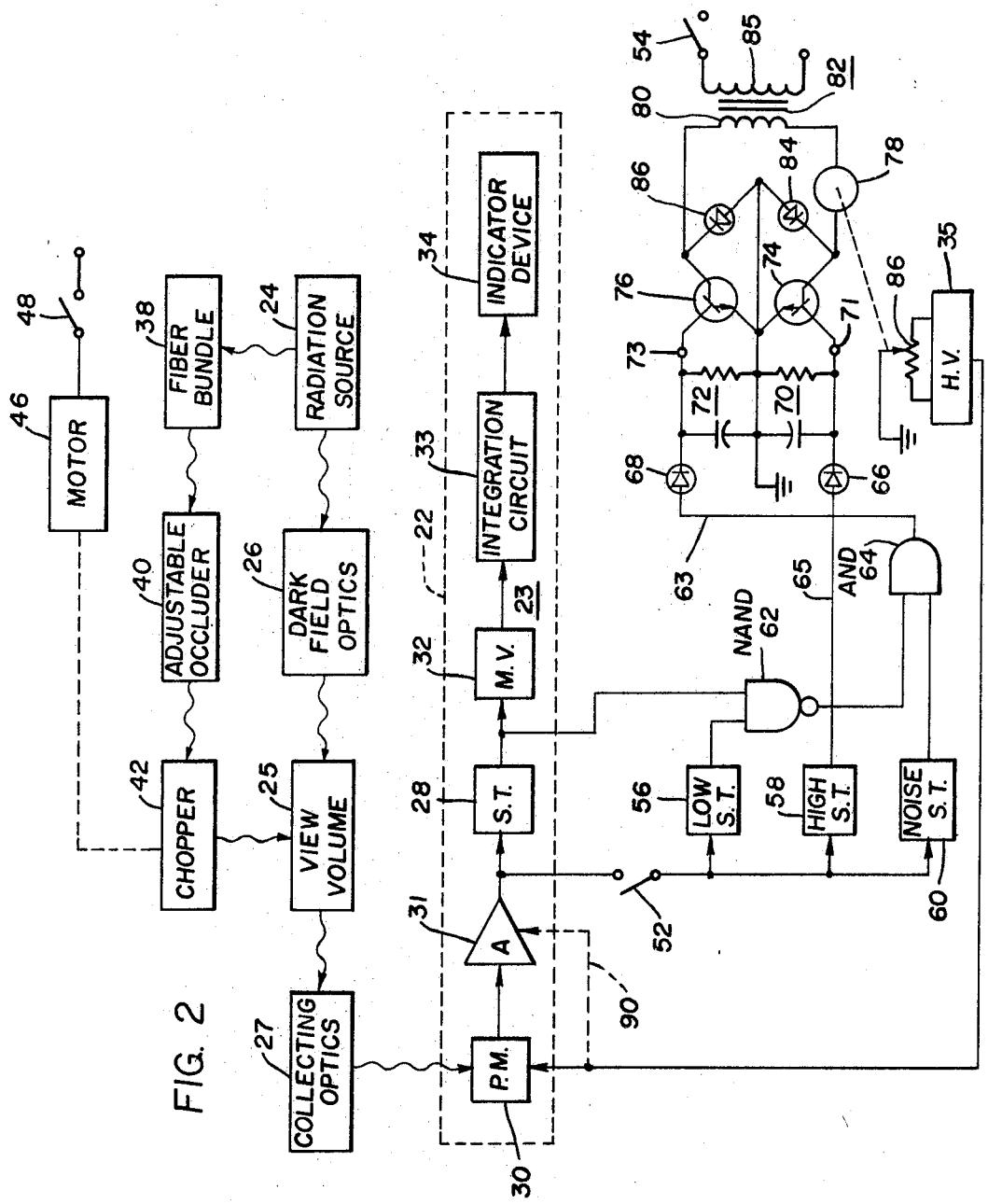
FIGURE 2 is an expanded block diagram of FIGURE 1.

This gain control system is particularly adapted to control the gain of photoelectric systems such as those employed in particle counters, particle size detectors, etc. as illustrated in FIGURE 2, but not necessarily limited thereto. The dashed lines 22 of FIGURE 2 enclose a block diagram of a particle detector photoelectric circuit 23 corresponding to a particle size detector circuit disclosed in a copending application Ser. No. 491,720, now Patent No. 3,393,319, for John M. Randall and Alexander E. Martens filed on Sept. 30, 1965.

Radiation from a source 24 is directed through a view volume 25 by a dark field optics system 26. The particles to be monitored are passed through the view volume 25. Radiation scattered from the particles is collected by the collecting optics 27 and is directed toward a photomultiplier tube circuit 30. The photomultiplier tube circuit 30 receives light pulses corresponding to the size of the particle monitored due to the light scatter effect and generates electric signals having an amplitude corresponding to the amount of radiation received. The electric signals are amplified by an amplifier 31 and are applied to a threshold circuit 28 designated as a Schmitt trigger (S.T.). The output of the Schmitt trigger 28 is coupled to activate a monostabel multivibrator circuit 32 that provides signals of constant duration for each pulse received. The output signals from the multivibrator circuit 32 are integrated by an integrator circuit 33 and are applied to an indicator device 34. The photoelectric apparatus described functions to count light pulses having amplitudes above a predetermined amplitude (corresponding to a given size of dust particle and greater) and provides an output corresponding to the rate at which such light pulses are received (number of dust particles monitored per unit time). The complete description of such a circuit is disclosed in the copending application Ser. No. 491,720, now Patent No. 3,393,319.

The photomultiplier tube is a sensitive device whose operation is determined by a number of variable conditions. Accordingly, the amplitude of the electric signal generated by the photomultiplier tube is a function of the amount of radiation received, the portion of the tube irradiated, the magnitude of the energizing potential applied thereto and the temperature of operation. In order to have an accurate and stable operating system, the output of the photomultiplier tube must be controlled with respect to these variables so that the amplitude of the electrical signals applied to the threshold circuit is constant for constant amplitude light pulses received. The operation of the photomultiplier tube is controlled in the present embodiment by adjusting the amplitude of the high voltage applied to the photomultiplier from a high voltage power supply 35.

The automatic gain control system of the invention includes a light modulation system for applying reference signals to the photoelectric system 23 to provide standard signal amplitudes to which the system can be calibrated. In the particular embodiment illustrated in FIGURE 2, radiation from the radiation source 24 is applied through an optical fiber bundle 38, an adjustable occluder 40, a chopper 42 and the view volume 25 to the photomultiplier tube circuit 30. The adjustable occluder 40 controls the amount or intensity of radiation applied to the photomultiplier tube. The chopper 42 is driven by a motor 46 energized by the switch 48 to apply the light pulses to the photomultiplier tube at a constant rate. When the chopper motor 46 is deenergized, the chopper 42 functions as an occluder to block any light from the adjustable occluder 40.

In order to assure the accuracy of the operation of such a system, it is generally desirable to periodically check the calibration of the system. The calibration cycle of the automatic gain control begins by closing the switches 48, 52 and 54 to initiate the calibrating procedure. This can be accomplished periodically by a timer motor or manually by the operator. When the switch 48 closes, the chopper motor 46 drive the chopper 42 to apply periodic pulses of light to the photomultiplier tube. The amplified signal from the amplifier 31 are applied through the switch 52 to three threshold detector circuits illustrated as the "low" Schmitt trigger 56, the "high" Schmitt trigger 58 and the "noise" Schmitt trigger 60. The "noise" Schmitt trigger 60 is set to trigger just above the maximum noise level. The "low" Schmitt trigger 56 is adjusted to trigger just below the level of Schmitt trigger 28. The "high" Schmitt trigger 58 is adjusted to trigger at a predetermined amplitude higher than the Schmitt trigger 28. Hence, the trigger levels of the Schmitt triggers 56 and 58 define a "window" for calibrating the photoelectric circuit, while the "noise" Schmitt trigger limits the sensitivity of the automatic gain control system to useful signals.

The output circuits of the Schmitt triggers 28 and 56 are coupled to a NAND gate 62. The output circuit of the NAND gate 62 and the Schmitt trigger 60 are coupled to an AND gate 64.

When the pulses from the amplifier 31 arrive at the input circuits of the Schmitt triggers 28, 56, 58 and 60, one of four operating conditions can result. In the first condition, the pulses are too small to trigger the Schmitt triggers 28, 56, and 58 but are large enough to trigger the "noise" Schmitt trigger 60. In this case, the NAND gate 62 is open and applys an enabling signal to the AND gate 64 so that the pulses from the Schmitt trigger 60 pass through the AND gate to develop a first control signal on the line 63.

In the second condition, the pulses are large enough to trigger the "noise" and "low" Schmitt triggers 60 and 56, but not large enough to trigger the Schmitt triggers 28 and 58. In this case, the NAND gate 62 is still open to apply an enabling signal to the AND gate 64 so that the pulses from the Schmitt triggers 60 continue to pass through the AND gate 64.

In the third condition, the pulses are large enough to trigger the Schmitt triggers 28, 56 and 60, but not the "high" Schmitt trigger 58. In this case, the NAND gate 62 is closed removing the enabling signal from the AND gate 64 and, therefore, no control signal is developed.

In the fourth condition, the amplitude of the pulses is great enough to trigger all the Schmitt triggers. In this case, the Schmitt trigger 58 generates a pulse for each pulse received to develop a second control signal on the line 65.

The output circuits of the Schmitt trigger 58 and the AND gate 64 are connected to a gain control circuit through the diodes 66 and 68 respectively. The integrating circuits 70 and 72 are coupled to the diodes 66 and 68 respectively, each including a parallel capacitor and resistor comprising a time constant that is several times that of the interval between two successive light pulses applied to the photomultiplier tube circuit 30. The integrating circuits 70 and 72 are connected through the terminals 71 and 73 to apply signals to the switching transistors 74 and 76 respectively.

The switching transistors 74 and 76 are connected in a series circuit with motor 78 and a secondary winding 80 of a transformer 82 through the diodes 84 and 86 respectively. The primary winding 85 of the transformer 83 is connected through the switch 54 to a suitable source of alternating current. The motor 78 is coupled to drive a potentiometer 86 to control the magnitude of high voltage applied from the power supply 35 to the photomultiplier tube circuit 30. The operation of this control circuit is set forth in detail in a copending patent application entitled "Null Balancing Servo System," Ser. No. 422,638, now Patent No. 3,406,309, filed for the same inventor and assigned to the assignee of the present application.

In the previous mentioned low gain conditions 1 and 2 (wherein the signals were great enough to trigger the "noise" and "low" Schmitt triggers 56 and 60 but not Schmitt triggers 28 and 58), the first control signal from the AND gate 64 is applied through the diode 68 and the integrator circuit 72 to render the transistor 76 conductive. The transistor 76 will conduct through the diode 86 and the motor 78 each time the voltage across the secondary winding 80 is of the correct polarity. The motor 78 in this case will drive the potentiometer 86 in a direction to increase the high voltage applied to the photomultiplier tube to increase the gain thereof. This, in turn, increases the amplitude of the pulses applied to the Schmitt triggers to an amplitude at which the Schmitt trigger 28 is triggered, causing the AND gate 64 to be disabled.

When the gain of the photomultiplier tube is too high (condition the Schmitt trigger 58 is triggered to render the transistor 74 conductive), the transistor 74 conducts through the diode 84 and drives the motor 78 in a direction opposite that previously mentioned, when the voltage across the secondary winding 80 is reversed. In this case, the motor will drive the potentiometer 86 in a direction to reduce the voltage on the photomultiplier tube circuit 30 until the amplitude of the pulses are below the trigger level of the Schmitt trigger 58, but above the level of the Schmitt trigger 28.

Although the automatic gain control of the self-calibrating detection system of the invention has been described with respect to control of the gain of a circuit including a photoelectric transducer, it is to be understood that the same concepts will apply to various electronic circuits in general. For example, the reference source 12 and transducer 10 of FIGURE 1 can comprise an electrical source for genearting constant amplitude pulse type electrical signals. In such a case, the high voltage supply 35 will be a suitable biasing source and connected through the dashed lines 90 to control the gain of the amplifier 26 (rather than the photomultiplier circuit 30). The automatic gain control circuit would operate in the same manner as described, to control the amplitude of the signals applied to the threshold circuit 14 within the "window."

It should be noted that the same source of radiation 24 is used for generating both the reference signals for automatic calibration and the test signals for particle size detection. Accordingly, the particle detection system is also adjusted to compensate for any changes in the intensity of the radiation emitted by the source.

Figure 3:
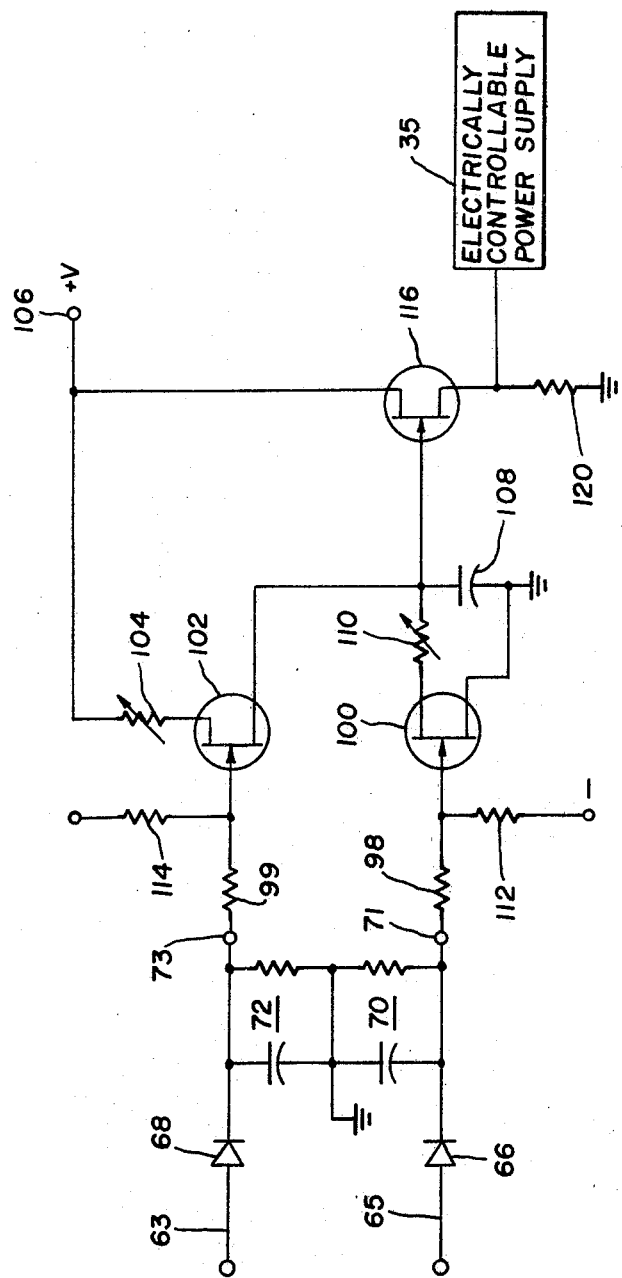
FIGURE 3 is a modification of a portion of the gain control system of FIGURE 2.

FIGURE 3 is an illustration of a solid state gain control circuit replacing the motor driven circuit of FIGURE 2. The high voltage power supply is now conventional direct current (D.C.) controllable power supply. The D.C. voltage developed at the terminals 71 and 73 is now applied through the resistors 98 and 99 to a pair of field-effect transistors 100 and 102, connected in a circuit to develop a direct current control signal, the magnitude of which is dependent upon the duration of the signals on the lines 63 and 65.

The drain electrode of the transistor 102 is connected through a potentiometer 104 to power supply terminal 106, while the source electrode is connected through a capacitor 108 to ground. The collector and drain electrodes of the transistor 100 are connected with a series potentiometer 110 in shunt with a capacitor 108. The transistors 100 and 102 are normally biased to cut-off by the resistors 112 and 114 respectively. The electrode of a transistor 116 is connected to the ungrounded end of the capacitor 108. The source and drain electrodes of the transistor 116 are connected between the terminal 106 and ground through a resistor 120. The source electrode of the transistor 116 is connected to apply a control signal to the power supply 35. The output of the power supply is applied to the photomultiplier tube 30 or the amplifier 31 as illustrated in FIGURE 2.

When a signal is present on a line 63, the transistor 102 is rendered conductive to charge the capacitor 108 in a positive direction at a rate determined by the potentiometer 104. This causes the transistor 116 to increase in condition and develop a higher potential across the resistor 120. The higher potential increases the voltage developed by the power supply 35 which in turn increases the gain of the adjustable gain circuit. When the gain of the adjustable gain circuit is sufficiently increased, the signal will be then removed from the line 63 allowing the transistor 102 to be cut off. The capacitor 108 remains charged at the level until charged to a higher level by the transistor 102 or discharged by the transistor 100. The capacitor 108 is discharged when signals from the amplifier 31 exceed the threshold level of the Schmitt trigger 58. At this time a signal is present on the line 65 and the transistor 100 is rendered conductive to discharge the voltage across the capacitor 108 at a rate controlled by the setting of the potentiometer 110. This reduces the magnitude of the signal applied to the power supply 35 and accordingly reduces the gain of the connected adjustable gain circuit until the signal is removed from the line 65.

Although the control circuit of FIGURE 3 is illustrated as a complete solid state circuit, it should be noted that the circuit can be modified to provide more isolation for the capacitor 108 by connecting the transistors to drive separate relays. The transistor 102 can, for example, energize a relay connected to charge the capacitor 108, while the transistor 100 can energize a relay to discharge the capacitor.

I claim:

1. An automatic gain control system for controlling an adjustable gain circuit coupled to apply signals to a threshold circuit that produces an output signal in response to a signal exceeding a first preset amplitude comprising:

gain control means coupled to said adjustable gain circuit for controlling the gain thereof;

means for applying standard amplitude signals to said adjustable gain circuit;

first circuit means coupled to said threshold circuit for developing a first control signal when the amplitude of the signal to said threshold circuit is between a minimum level and a second preset amplitude less than said first preset amplitude;

second circuit means coupled to receive the signals applied to said threshold circuit for developing a second signal when the signal to said threshold circuit exceeds said first preset level by a predetermined amount;

third circuit means coupled between said gain control means and said first and second circuit means responsive to said first and second control signals for adjusting the gain of said adjustable gain circuit to produce an output signal having an amplitude between said first and second preset amplitudes, and circuit means for periodically activating said automatic gain control system.

2. An automatic gain control system comprising:

transducer means for generating an electrical signal in response to a signal applied thereto;

means for applying reference signals having a predetermined amplitude to said transducer;

amplitude sensitive circuit means for generating an electrical signal in response to a signal above a first predetermined amplitude;

circuit means coupling said transducer means to said amplitude sensitive circuit means for applying said electrical signal thereto;

control means for controlling the response of said transducer means;

circuit means receiving the signals applied to said amplitude sensitive circuit means for generating a first control signal when the amplitude of the signal received by said amplitude sensitive circuit is below said first predetermined amplitude and a second control signal when the amplitude of the signal is above a second predetermined amplitude greater than said first predetermined amplitude, and circuit means for applying said first and second control signals to said control means so that the amplitude of signal received by said amplitude sensitive circuit means is between said first and second predetermined amplitudes.

3. Automatic gain control for self-calibrating a detection system comprising:

a transducer for producing electrical signals in response to an event;

a first threshold circuit coupled to said transducer triggerable only by an input signal exceeding a first preset amplitude;

an adjustable gain circuit coupled to apply signals to said first threshold circuit;

means for applying reference signals to said adjustable gain circuit;

circuit means coupled to said first threshold circuit and said adjustable gain circuit for generating a first control signal when the amplitude of the input signals to said first threshold circuit is between a minimum amplitude and said first preset amplitude and a second control signal when the amplitude of the input signals to said first threshold signal exceed a second preset amplitude which is greater than said first preset amplitude, said circuit means comprising at least one threshold circuit triggered by signal amplitudes below said first preset amplitude coupled to said adjustable gain circuit, switching circuit means coupled to said threshold circuits which are triggered by signals below said first preset amplitude and said first threshold circuit for generating said first control signal, and a threshold circuit triggered by signal amplitudes above said second preset amplitude for developing said second control signal coupled to said adjustable gain circuit; and gain control means coupled between said adjustable gain circuit and said circuit means responsive to said first and second control signals for changing the gain of said adjustable gain circuit in opposite directions.

4. The automatic gain control as defined in claim 3 wherein:

two threshold circuits are triggered by signal amplitudes below said first preset amplitude, one at a level substantially lower than said first preset amplitude and the other at a level approaching said first preset amplitude.

5. The automatic gain control as defined in claim 4 wherein said gain control means comprises:

a potentiometer;

a motor coupled to drive said potentiometer;

a drive circuit receiving said first and second control signals and coupled to said motor to drive said motor in one direction in response to said first control signal and in the opposite direction in response to said second control signal, and circuit means coupling said potentiometer to said adjustable gain circuit for controlling the gain thereof.

6. The automatic gain control as defined in claim 5 wherein:

said adjustable gain control circuit includes a photosensitive device, and said potentiometer controls the gain of said photosensitive device.

References Cited

UNITED STATES PATENTS 3,184,597  5/1965  Scherbatskoy _____ 250—71.5

RALPH G. NILSON, Primary Examiner

T. N. GRIGSBY, Assistant Examiner

U.S. Cl. X.R.

250—71.5, 207, 222; 328—173, 243